No. 820,504. PATENTED MAY 15, 1906.
A. S. KROTZ.
CONTROLLER FOR ELECTRIC MOTORS.
APPLICATION FILED NOV. 4, 1904.

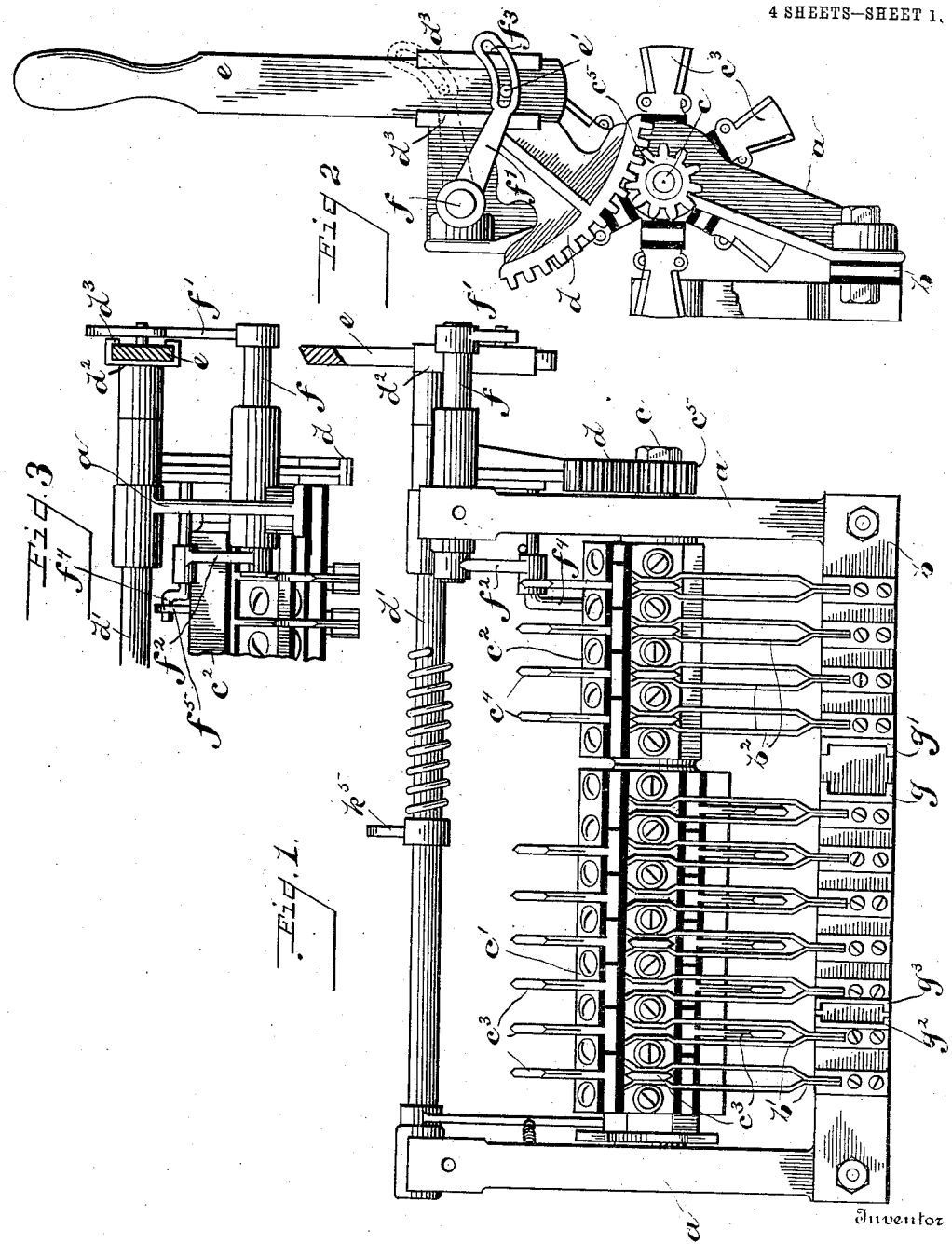

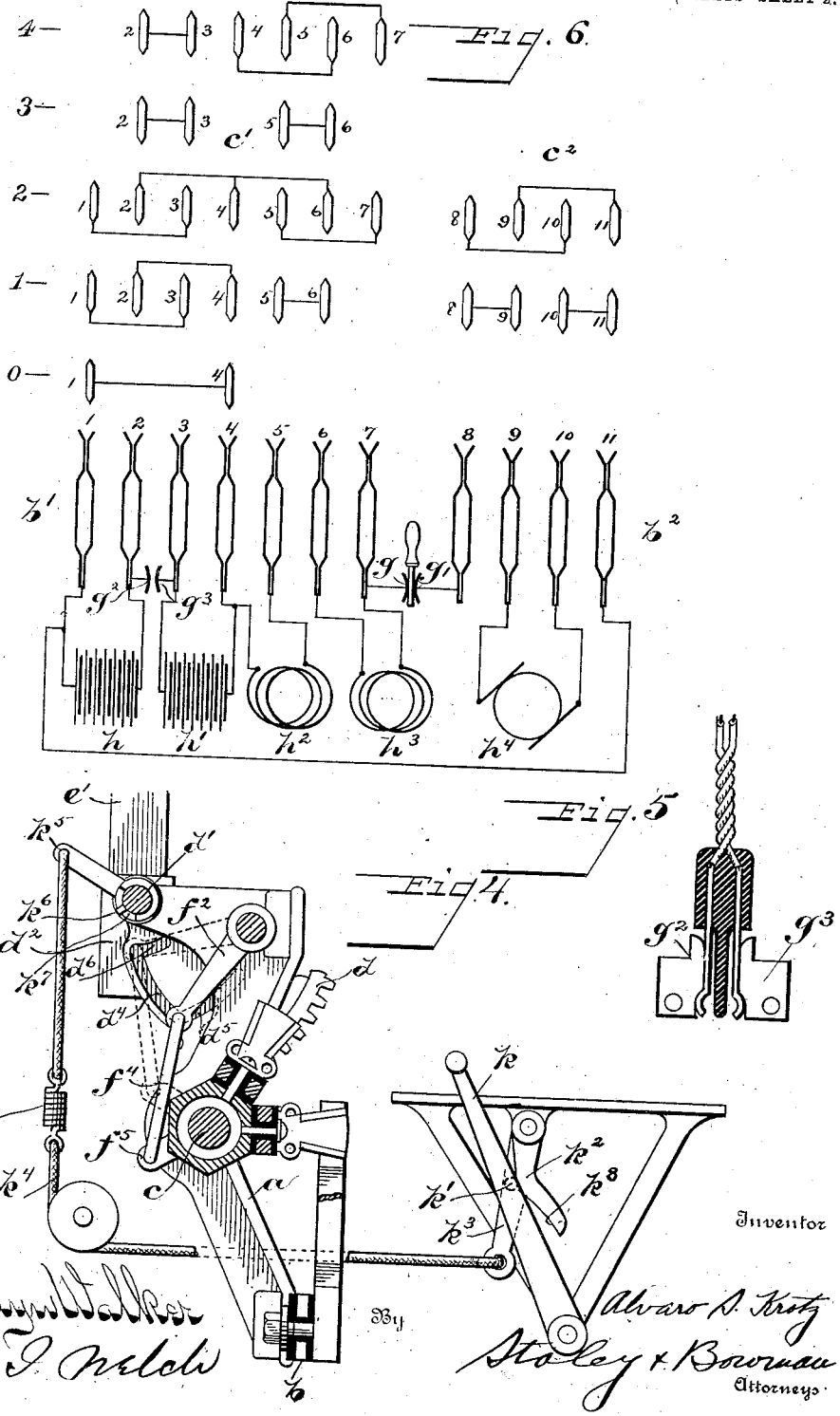

4 SHEETS—SHEET 3.

Witnesses
F. Llewellyn Walker
Chas. D. Welch

Inventor
Alvaro S. Krotz
By Staley & Broman
Attorneys

UNITED STATES PATENT OFFICE.

ALVARO S. KROTZ, OF SPRINGFIELD, OHIO.

CONTROLLER FOR ELECTRIC MOTORS.

No. 820,504.   Specification of Letters Patent.   Patented May 15, 1906.

Application filed November 4, 1904. Serial No. 231,339.

*To all whom it may concern:*

Be it known that I, ALVARO S. KROTZ, a citizen of the United States, residing at Springfield, in the county of Clark and State of Ohio, have invented certain new and useful Improvements in Controllers for Electric Motors, of which the following is a specification.

My invention relates to improvements in controllers for electric motors, and especially to controllers adapted for use with electric carriages.

The object of my invention is to provide a simple, safe, and economical controller especially adapted for electric carriages and to secure different speeds with the most economical use of the electric current.

A further object of my invention is to provide a controller in which the control of the reversing-switch is effected by the same lever which controls the speed of the vehicle, means being provided through which a reversing action is prevented except when the speed-controller is in the off position.

A further object of my invention is to arrange the controller parts in such manner that the battery connections shall be so placed in respect to the controller that the parts thereof can be utilized for both the running and for the charging connections.

A further object of my invention is to provide a controller by means of which the battery may be utilized in sections in connection with the fields, so that the battery-sections can be used either in multiple or series with the fields of the motor either in multiples or series, thus giving a large number of different speed and power combinations without the use of a rheostat and without undue resistance in the operating-circuits.

A further object of my invention is to provide in connection with the controller and locking device a brake-lever whereby the operation of the controller to supply the current to the motor is prevented while the brake-lever is in a set position and, further, to provide means for moving the controlling-lever to the off position when the brake is applied, thus preventing waste of current and danger to the motor by having the brake and the current applied at the same time.

I attain these objects by the constructions shown in the accompanying drawings, in which—

Figure 6A:
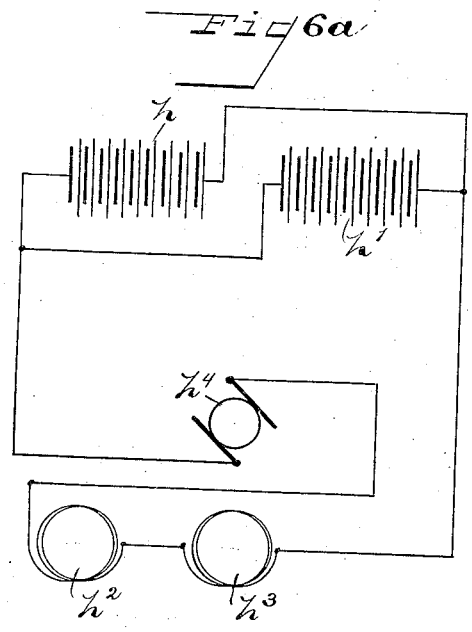
Figure 6B:
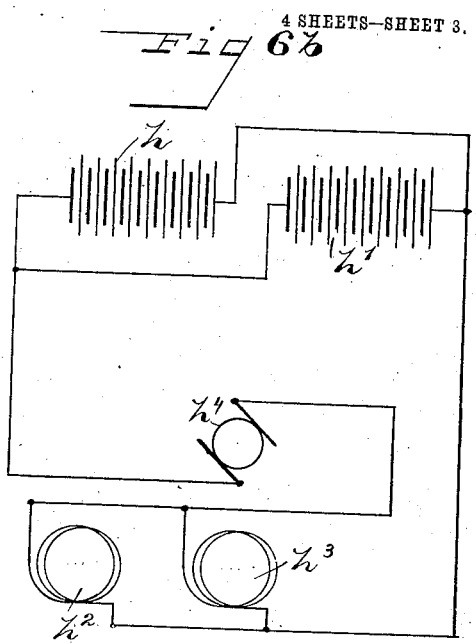
Figure 6C:
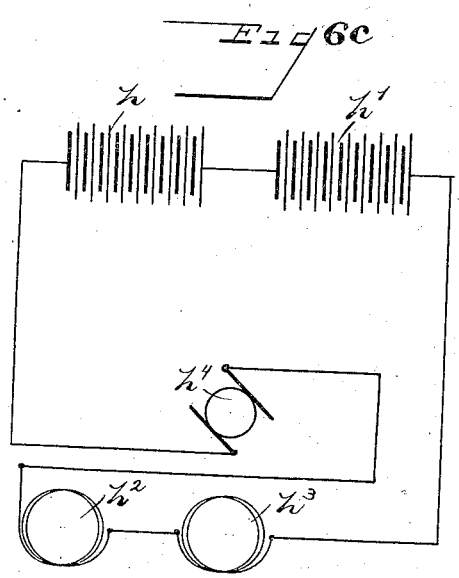
Figure 6D:
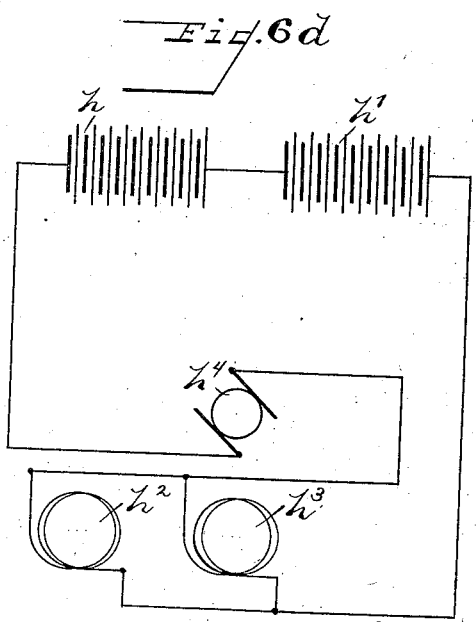
Figure 8:
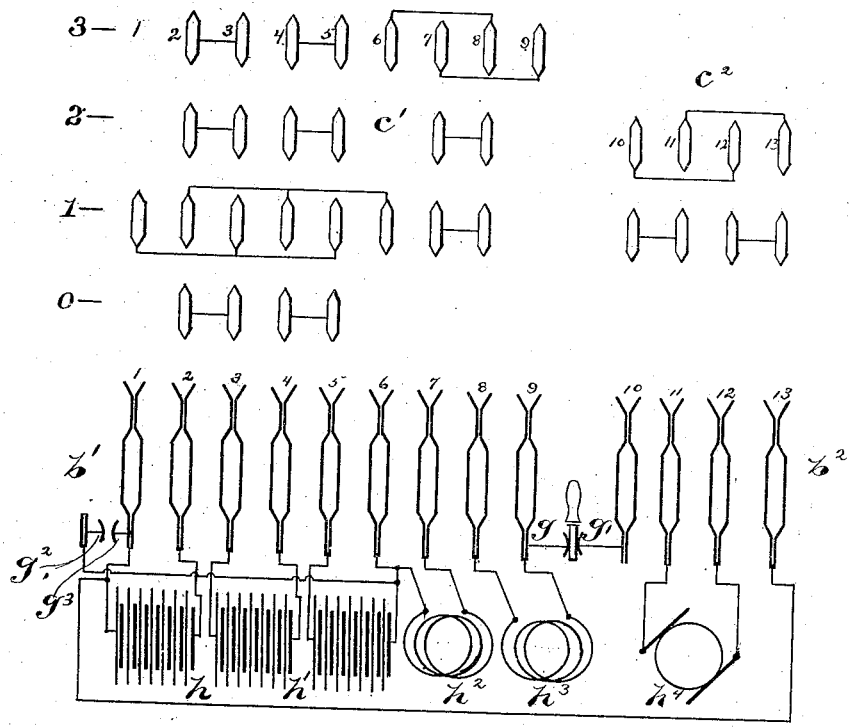
Figure 7:
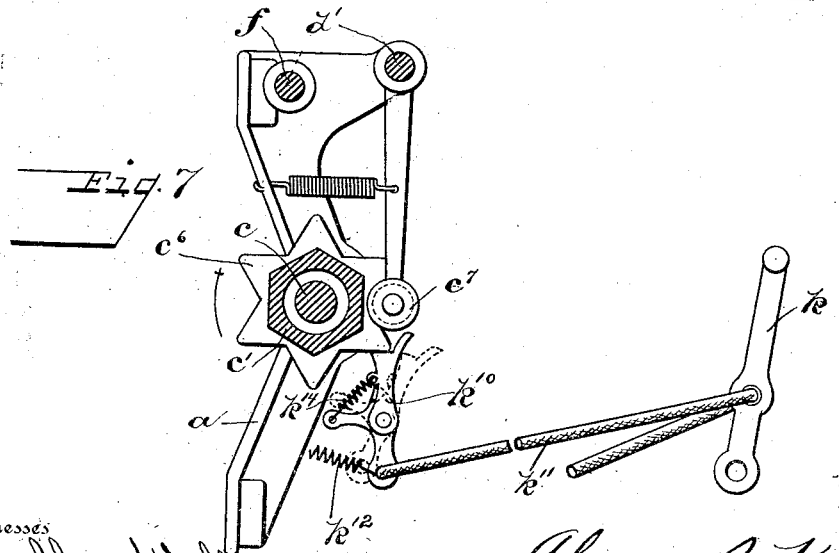

Figure 1 is a side elevation of the controlling device. Fig. 2 is an end elevation, and Fig. 3 is a partial plan view of the same. Fig. 4 is a sectional elevation showing the arrangement of the reversing drum or switch and also showing the brake connections with the controller. Fig. 5 is a detail view of the charging-plug. Fig. 6 is a diagrammatic view showing the arrangements of the circuits between the contact-points and the controller, the batteries, the motor-fields, and the motor-armature, and also of the circuits of the reversing switch or drum. Figs. $6^a$, $6^b$, $6^c$, and $6^d$ are diagrammatic views showing circuits formed by the various sets of contacts on the speed-drum. Fig. 7 is an end view of a part of the controller-frame and the shaft of the controlling-drum, showing the star-wheel and pawl device for holding the controller in different positions of adjustment and also showing a modification in the brake-locking device used in connection with said controller. Fig. 8 is a diagrammatic view of the contact-points, motor, and battery circuits, showing different number of units or sections in the battery.

Like parts are represented by similar characters of reference in the several views.

In the said drawings, (see particularly Figs. 1 to 4,) $a$ represents the end supports of the controller-frame, which are connected together at the bottom by a bar $b$. Journaled in suitable bearings in the end pieces $a$ is a shaft $c$, which carries what I term a "speed-drum" $c'$ and "reversing-drum" $c^2$. The speed-drum $c'$ is secured to and rotates with the shaft $c$, but the reversing-drum $c^2$ is mounted loosely on said shaft $c$ and is adapted to rotate independently thereof. Each of these drums consists of a series of projecting contact bars or blades, those in the speed-drum being marked $c^3$ and those in the reversing-drum being marked $c^4$. Mounted upon the cross-bar $b$, but insulated therefrom, is a series of spring-arms $b'$ and $b^2$, adapted to form, with the blades $c^3$ and $c^4$ of the respective drums, electrical connections or switches. These arms $b'$ and $b^2$ are preferably formed of two parts of resilient metal, between which the blades are adapted to pass to form the electrical connection. Any form, however, of contact which will establish a proper electrical connection between these respective parts may be employed. I preferably employ on the speed-drum $c'$ four series of these projecting blades, which blades are connected together in a manner hereinafter described in such a way as to form electrical connections between the desired contact arms or springs $b'$, and the arms or springs $b'$ are connected electrically in the manner hereinafter more fully described, to the batteries and to the fields and armature of the motor.

The reversing-drum $c^2$ has preferably two series of blades, with four blades each. Each of these blades is so connected that when one set of blades is in contact with their spring-arms the current will pass in one direction, and when the other set of blades is in contact the current will pass in a different direction. The spring-arms $b^2$ for the reversing-drum are also electrically connected with the different parts of the machine in the manner hereinafter specified.

To provide for rotating the shaft $c$, I provide at one end of the shaft a pinion $c^5$, and with this pinion $c^5$ I mesh a gear-segment $d$, which is secured to a shaft $d'$, also mounted in the frame-pieces $a$ $a$. To provide for oscillating the shaft $d'$, I mount upon one end of said shaft $d'$ a head $d^2$, which is formed with guides or ways $d^3$ to receive a hand-lever $e$. The construction of this head is such that the hand-lever may slide through the head by rocking the hand-lever to impart a rotary or oscillating movement to the shaft $d'$. Adjacent to the shaft $d'$ and parallel therewith is a short shaft $f$, mounted in a suitable bearing in one of the frame-pieces $a$. This shaft is provided at one end with an arm $f'$ and at the other end with an arm $f^2$. The arm $f'$ projects in the proper direction to lie adjacent to the member $d^2$, which carries the hand-lever $e$ and is provided with a curved slot $f^3$, which engages over a pin $e'$, which projects outwardly from said hand-lever $e$. The arm $f^2$ on the opposite end of the shaft $f$ (see Fig. 4) is connected by a link $f^4$ to an arm or projection $f^5$ on the reversing-drum $c^2$, so that when the hand-lever $e$ is moved through the head $b^3$ the shaft $f$ is rocked and by means of the link connection $f^4$ rotates or oscillates the reversing-drum $c^2$ upon the shaft $c$, this motion, as it will be seen, being independent of the movement of the speed-drum, which is moved only when the shaft $c$ itself is rotated. It will thus be seen that the hand-lever $e$ is capable of two movements—one through the head $d^3$, which will operate the reversing-drum, and a rocking movement, which will impart a rocking movement to the shaft $c$ and rotate the speed-drum.

In order to insure that one set or other of the blades of the reversing-drum shall be in contact with the contacting fingers when the lever is operated to move the speed-drum, means are provided for locking said lever against oscillatory movement except when the hand-lever is moved to the limit of its movement through the head $d^2$ in one direction or the other. Means are also provided for preventing movement of the hand-lever $e$ through the head $d^2$ to effect this reverse movement except when the hand-lever is in its off or normal position. This is accomplished as follows: The hand-lever $e$ is preferably mounted to stand vertical in its normal position and to be moved forward to operate the speed-drum to establish the necessary electrical connections through the controller. The gear-segment $d$, which is mounted on the shaft $d'$, is provided in its back with a cam-groove having three branches $d^4$, $d^5$, and $d^6$, and a projection on the arm $f^2$ is adapted to engage in this cam-groove. The main branch $d^4$ of this cam-groove is when the hand-lever $e$ is in its normal position concentric with the shaft $f$, the other branches $d^5$ and $d^6$ being concentric with the shaft $d'$, on which the gear-segment is mounted. It will be seen, therefore, that when the hand-lever $e$ is pressed to the limit of its downward stroke, which in this case is in the position for the forward movement of the machine, the cam-groove $d^5$ will be opposite the projection, and the segment $d$ can be moved back or forth within the limits of said cam-groove. When the hand-lever is raised to its upper position, the said projection will be opposite the branch $d^6$ of said cam-groove, and the same movement can be effected; but at any intermediate point between the upper and lower positions of the hand-lever the projection on the arm $f^2$ will engage with the branch $d^4$ of the cam-groove and prevent any movement of the segment in either direction. The arm $f'$, which rotates the shaft $f$ by the end movement of the lever $e$, has a curved slot, as before stated. When the lever is in its upper position, this curved slot stands opposite the center of the shaft $d'$, and thereafter the pin turns naturally in the slot $f^3$. When the hand-lever $e$ is in its lower position, the slot $f^3$ is concentric to the shaft, which will permit the rocking movement of the hand-lever to turn the speed-drum to the different positions desired.

*Electrical connections.*—In order to simplify the connections and render all the parts accessible, I form the electrical connections in such a manner that the terminals are brought upon the bar $b$, so that the running connections and the charging connections can be made directly on this bar by means of suitable plug-switches for this purpose. The terminals for the running connection are shown at $g$ and $g'$ and those for the charging-current at $g^2$ and $g^3$, Fig. 1.

For perspicacity I have shown the electrical connections in diagram in Fig. 6, and I have numbered the contacting arms for the speed-drum $c'$ from 1 to 7, respectively, and those for the reversing-drum $c^2$, 8, 9, 10, and 11 and have numbered the contacting blades on these respective drums correspondingly. The running or speed contacts are shown in series above these contacting arms and numbered from 0 to 4, the connections between the respective blades of each series being shown in diagram. From this it will be seen that when the controller is in the 0 or off position the blades 1 and 4 contact with the spring-arms 1 and 4. If the charging-plug, therefore, is inserted between the terminals $g^2$ and $g^3$, the battery may be charged, there being no other electrical connection between the respective parts. The motor-armature is connected to the arms 9 and 10, and when the reversing-drum is in the first position the arms 8 and 9 will be electrically connected at 10 and 11, which when proper electrical connection has been made with the fields of the motor will cause the current to pass through the armature in proper direction to rotate it forward.

When the reversing-drum is in second position, the arms 8 and 10 and 9 and 11 will be electrically connected, which will cause the current to be reversed, and thus will drive the armature in the opposite direction. The arms 7 and 8, which represent a terminal of the field and armature, respectively, are normally disconnected and are electrically connected only by inserting the running-plug (shown at $x$ in Fig. 6) between the terminal contacts $g$ and $g'$. If the lever is moved forward to the first position, the contact between the blades 1 and 4 and their corresponding arms is broken and the arms 1 and 3, 2 and 4, and 5 and 6 are brought into electrical connection, which results in establishing a multiple connection between the battery-sections and the field-coils of the motor in series, these parts being represented in Fig. 6 in the conventional way, the battery-sections being shown at $h$ and $h'$, the field-coils at $h^2$ and $h^3$, and the armature of the motor at $h^4$. If the speed-drum should be moved to the second running position, the arms 1 and 3 and 5 and 7 are brought into electrical connection, while 2, 4, and 6 are electrically connected, thus giving a multiple battery connection and a multiple field connection. When it is turned to the third position, electrical connection is established between 2 and 3 and 5 and 6, bringing the battery-sections in series and the fields in series, and when turned to the fourth position the battery-sections are in series and the field-coils in multiple, these different combinations giving to the motor different speeds without the aid of a rheostat or the addition of resistance.

To provide for preventing the application of the brake of t vehicle when the current is being supplied to the motor and also to prevent the application of the electric current to the motor while the brake is being applied, I provide means connected with the brake-lever for returning the controlling-lever to normal position when the brake-lever is moved to apply the brake and also to lock the controlling-lever in normal position when the brake-lever is in position to apply the brake. This is accomplished as follows, (see Fig. 4:) The brake-lever $k$, connected to the vehicle-frame and attached by the usual or any suitable means to the brake mechanism, is provided with a stud or projection $k'$, which stands adjacent to and in line with a cam-arm $k^2$. This cam-arm is formed integral with or connected to an arm $k^3$, connected by a cable $k^4$ or other suitable means to an arm $k^5$ on the shaft $d'$. This arm $k^5$ is not attached rigidly to said shaft, but is held thereon by a pin $k^6$, which extends through a slot or recess $k^7$ in the hub of the arm $k^5$, which permits a limited movement of these parts one with reference to the other. The cam-lever $k^2$ is so formed that at the first movement of the lever $k$ movement will be imparted to the arm $k^5$ sufficient to bring the pin $k^6$ to the end of the slot or recess $k^7$, and thus lock the controller-lever $e$ against forward movement, and in the event that the controller-lever has been in an advanced position this movement will be sufficient to return it to normal position. A further movement of the brake-lever $k$ after this initial movement will cause the pin or projection $k'$ to travel along a curved surface $k^8$ of said cam-lever, and thus lock the lever $k^3$ in its position, and as a result lock the controlling-lever $e$ against movement, thus preventing any application of the current when the brake is being applied and also cutting off the electric current in case it has been applied by returning the controlling-lever $e$ to normal position. It might occur that for some reason the controller would stick—as, for instance, the blades on the speed-drums might become electrically welded to the connections—in which case it would be desirable to apply the brake independently of the controlling-lever, and to accomplish this I preferably provide as a part of the connection $k^4$ a spring or elastic link $k^9$ of sufficient tension to return the controlling-lever and also to prevent it from being moved forward with an ordinary pressure without overcoming the tension of said spring, but which by an unusual pressure will yield sufficiently to permit the brake-lever to be operated independently of the controller. As this is simply a safeguard and is to guard against a possible contingency which may be quite remote, the unusual effort on the brake-lever which is sufficient to relieve the yielding device $k^9$ will be of minor importance. Instead of this yielding device $k^9$ the connection $k^4$ may have a breakable link, which will break under an unusual pressure, but which will be sufficient to operate in the usual way under normal conditions.

Various forms of yielding or breakable connections are in use for various purposes, and the particular form of such connection forms no part of this invention.

In Fig. 7 I have shown a modification of the brake connections. The shaft $c$, which carries the respective drums $c'$ and $c^2$, will be provided with the usual star-wheel $c^6$, having engaging therewith a retaining-roll $c^7$, by which the drums will be normally retained in their respective positions. In connection with this star-wheel $c^6$ I employ a pivoted arm $k^{10}$, the lower end of which is connected by a suitable connection $k^{11}$ to the brake-lever. This arm $k^{10}$ will be normally held out of the path of the star-wheel by a spring $k^{12}$. When the brake is applied, the lower end will be drawn outwardly, thus forcing the inner end inwardly in the path of the star-wheel, preventing the drums from being operated. This lever $k^{10}$ is preferably made in two pieces and pivoted together and connected by a spring $k^{14}$, which will permit a yielding movement between the parts, so that the shaft $c$ can be moved in one direction when the brake is on, but not in the other, thus permitting the hand-lever to be operated to throw off the current, but not to put it on.

Having thus described my invention, I claim—

1. In a controller, the combination of a speed mechanism, reversing mechanism, a hand-lever capable of being shifted longitudinally to different operative positions and adapted to operate by said longitudinal movement the reversing mechanism, and means connecting said hand-lever with the speed mechanism whereby the hand-lever will operate the speed mechanism in either position of adjustment, substantially as specified.

2. In a controller, the combination of speed mechanism, reversing mechanism, a hand-lever capable of being shifted independent of its movement about its pivotal connection and adapted when oscillated about its pivotal connection to operate one set of said mechanism, and when shifted independent of its oscillatory movement to operate the other set of said mechanism, and means for locking said hand-lever against movement to operate the speed mechanism until it has completed the operation of the reversing mechanism, substantially as specified.

3. In a controller, the combination of a speed-drum, a reversing drum or switch, a hand-lever, said hand-lever being adapted to operate the said speed-drum when given a backward-and-forward movement and to operate the said reversing-drum when given a vertical movement.

4. In a controller, the combination of a speed-drum, a reversing drum or switch, a hand-lever, said hand-lever being adapted to operate the said speed-drum when given a backward-and-forward movement, and to operate the said reversing-drum when given a longitudinal movement, and means whereby the said hand-lever will only operate the said reversing-drum when said speed-drum is in its off position.

5. In a controller, the combination of a speed-drum having a plurality of contacts arranged in sets, a reversing-drum, having contacts thereon arranged in sets, and connected in reverse order by use of which the polarity of the motor may be changed; a battery having two or more sections, a motor having two or more field-windings, said speed-drum being adapted to connect the said battery and motor through various multiple and series combinations of battery and field, and means for operating said speed-drum independent of said reversing-drum, whereby said various multiple and series combinations of battery and motor may be made irrespective of the particular set of reversing-drum contacts connecting the motor, thereby permitting a variable speed in either direction and a single operating-lever capable of movement independent of its oscillatory movement adapted to control the movements of both the speed and reversing drums, substantially as specified.

6. In a controller, the combination of a speed-drum, a reversing-drum, an operating-handle, a motor and a battery, said handle being adapted to operate the said speed-drum by a horizontal movement and the said reversing-drum by a vertical movement, the said reversing movement operating only when said speed-drum is in off position, the said motor-field being arranged in two or more sections, and said battery arranged in two or more sections, whereby the said speed-drum can connect the said battery and field circuits in series or multiple, substantially as and for the purpose specified.

7. In a controller, the combination of a speed-drum, a reversing-drum, an operating-handle, said operating-handle being slidingly mounted in a head, said head being adapted to operate said speed-drum, a reverse-drum-operating arm, means whereby the said operating-handle can operate the said speed-drum without changing the position of the said reversing-drum, and the said reversing-drum operating by a vertical or raising movement of said operating-handle when the said speed-drum is in its off position.

8. In a controller, the combination of a speed-drum, a reversing-drum, a supporting-frame, contact-fingers and contacts, a motor, a battery, an electric circuit, a running-plug, charging-plug contacts, said contact-fingers mounted on said frame, two of said contacts being adjacent to each other and adapted to close said electric current through said running-plug, and two of said contact-fingers adapted to be connected to said battery when said speed-drum is in the off position, substantially as and for the purpose specified.

9. In a controller, the combination with a speed-drum and a reversing-drum, of a hand-lever capable of a forward and a back movement and also of an up-and-down movement, means connected with said lever to operate said speed-drum by the forward-and-back movement and for operating said reversing-drum by the up-and-down movement, the connection between said lever and said speed-drum being such that said speed-drum will be operated by said lever in either the up or down position thereof, and locking means to prevent the forward-and-back movement of said lever except when said lever is at the limit of its movement up or down, substantially as specified.

10. In a controller, the combination of the speed-drum and reversing-drum, a hand-lever for operating said speed-drum by a forward-and-back movement and connections between said hand-lever and said reversing-drum for operating said reversing-drum by an up-and-down movement, and locking means to prevent said lever from operating said reversing-drum when said speed-drum has been thrown into operation, substantially as specified.

11. The combination of the speed-drum, the reversing-drum, and a hand-lever capable of an up-and-down and a forward-and-back movement, the forward-and-back movement being adapted to operate one of said drums and the up-and-down movement to operate the other of said drums, means for preventing the forward-and-back movement except when the lever is at the limit of its up or down stroke, and means for preventing the up-and-down movement except when the lever is in its normal or off position, substantially as specified.

12. In a controller, a controlling-frame having electrical controller-contacting devices connected respectively to the terminals of a battery, field-coils, and the armature respectively of a motor, and charging-plug contacts on said frame for charging said battery, a connecting device independent of the controller-contacts also on said frame adapted to open and close the circuit between the battery and motor, substantially as specified.

13. In a controller for electric vehicles, a speed-drum having electrical contacts adapted to control the speed to the motor, a ratchet-wheel on said speed-drum, a brake-lever, a ratchet-pawl, means for causing said pawl to engage said ratchet-wheel upon the operation of said brake-lever, whereby movement of the speed-drum only toward "off" position will be permitted, substantially as specified.

14. The combination with a controller and controlling-drum, of a hand-lever for operating said drum, a brake-lever connected to said hand-lever, and means for locking said hand-lever against forward movement when said brake-lever is moved to an operative position, substantially as specified.

15. The combination with the controller and the controlling-lever, of a brake-lever, means for connecting said brake-lever and said controlling-lever which will permit an independent movement of said controlling-lever when said brake-lever is in off position and an independent movement of said brake-lever when said controlling-lever is in off position but adapted to return said controller-lever to its normal position when the brake-lever is operated, and a yielding or breakable connection between said brake-lever and said controlling-lever, substantially as specified.

16. The combination of a controlling-lever and a brake-lever, a connection between said brake-lever and controlling-lever adapted to return said controlling-lever to normal position when the brake-lever is applied, and a yielding or breakable connection between said brake-lever and said controlling-lever, substantially as and for the purpose specified.

In testimony whereof I have hereunto set my hand this 27th day of October, A. D. 1904.

ALVARO S. KROTZ.

Witnesses:
CLIFTON P. GRANT,
PAUL A. STALEY.